(12) United States Patent
Sajjad et al.

(10) Patent No.: US 12,425,193 B2
(45) Date of Patent: Sep. 23, 2025

(54) RESOURCE ACCESS CONTROL

(71) Applicant: BRITISH TELECOMMUNICATIONS PUBLIC LIMITED COMPANY, London (GB)

(72) Inventors: Ali Sajjad, London (GB); Gery Ducatel, London (GB); Gabriele Gelardi, London (GB)

(73) Assignee: British Telecommunications Public Limited Company, London (GB)

( * ) Notice: Subject to any disclaimer, the term of this patent is extended or adjusted under 35 U.S.C. 154(b) by 531 days.

(21) Appl. No.: 17/753,774

(22) PCT Filed: Sep. 11, 2020

(86) PCT No.: PCT/EP2020/075501
§ 371 (c)(1),
(2) Date: Mar. 14, 2022

(87) PCT Pub. No.: WO2021/048377
PCT Pub. Date: Mar. 18, 2021

(65) Prior Publication Data
US 2022/0376902 A1 Nov. 24, 2022

(30) Foreign Application Priority Data
Sep. 12, 2019 (EP) .................................... 19197111

(51) Int. Cl.
*G06F 21/62* (2013.01)
*H04L 9/08* (2006.01)

(52) U.S. Cl.
CPC ............ *H04L 9/0825* (2013.01); *H04L 9/085* (2013.01); *H04L 9/0891* (2013.01)

(58) Field of Classification Search
None
See application file for complete search history.

(56) References Cited

U.S. PATENT DOCUMENTS 8,131,763 B2    3/2012  Tuscano et al.
8,909,297 B2   12/2014  Matas et al.
(Continued)

FOREIGN PATENT DOCUMENTS

AU    2018100672 A4    6/2018
CN     105678125 B     2/2019
(Continued)

OTHER PUBLICATIONS

Alrwais S., et al., "A Context-Aware Access Control Model for Pervasive Environments," NSS '09, Third International Conference on Network and System Security, IEEE, 2009, Piscataway, NJ, USA, XP031562007, ISBN: 978-1-4244-5087-9, pp. 425-430, abstract only.

(Continued)

*Primary Examiner* — Christopher B Robinson
(74) *Attorney, Agent, or Firm* — EIP US LLP (57) ABSTRACT

There is provided a computer implemented method for accessing a resource at a computing device, as well as for controlling access to a resource by a computing device. The computing device receives a policy indicating a set of conditions under which access to the resource is permitted, determines whether each of the conditions are initially present based on an output of one or more sensors of the device, and monitors the one or more sensors to detect a change in the presence of one or more of the conditions. In response to detecting the change in the presence of one or more of the conditions, the computing device determines whether each of the conditions are present. In response to determining that each of the conditions is present, access to the resource is enabled. If at least one of the conditions is not present, access to the resource is prevented.

10 Claims, 3 Drawing Sheets

(56) References Cited

U.S. PATENT DOCUMENTS

| | | | |
|---|---|---|---|
| 9,286,453 B2 | 3/2016 | Boss et al. | |
| 9,305,155 B1 | 4/2016 | Vo et al. | |
| 9,342,677 B2 | 5/2016 | Ali et al. | |
| 9,628,478 B2 | 4/2017 | Smith et al. | |
| 9,684,775 B2 | 6/2017 | Gupta et al. | |
| 9,788,203 B2 | 10/2017 | Dutt et al. | |
| 9,817,957 B1 | 11/2017 | Molina-Markham et al. | |
| 9,935,947 B1 | 4/2018 | Machani et al. | |
| 10,055,566 B2 | 8/2018 | Kwok-Suzuki et al. | |
| 10,057,227 B1 | 8/2018 | Hess et al. | |
| 10,063,562 B1 | 8/2018 | Molina-Markham et al. | |
| 10,104,073 B2 | 10/2018 | Novack et al. | |
| 10,140,441 B2 | 11/2018 | Cheng et al. | |
| 10,142,308 B1 | 11/2018 | Duchin et al. | |
| 10,146,922 B2 | 12/2018 | Guidotti et al. | |
| 10,652,238 B1 | 5/2020 | Edwards et al. | |
| 10,693,661 B1 | 6/2020 | Hamlet | |
| 10,778,677 B1 | 9/2020 | Griffin et al. | |
| 11,115,196 B1 | 9/2021 | Triandopoulos et al. | |
| 11,128,448 B1 * | 9/2021 | Bernat | G06F 21/40 |
| 11,336,462 B1 * | 5/2022 | Maganti | H04L 9/0852 |
| 12,130,910 B2 * | 10/2024 | Vivek | G06F 21/629 |
| 2002/0162031 A1 | 10/2002 | Levin et al. | |
| 2002/0186838 A1 | 12/2002 | Brandys | |
| 2010/0115610 A1 | 5/2010 | Tredoux et al. | |
| 2011/0191837 A1 | 8/2011 | Guajardo et al. | |
| 2012/0137340 A1 | 5/2012 | Jakobsson et al. | |
| 2012/0204035 A1 | 8/2012 | Camenisch et al. | |
| 2013/0097416 A1 | 4/2013 | Barra et al. | |
| 2013/0133055 A1 | 5/2013 | Ali et al. | |
| 2013/0246807 A1 * | 9/2013 | Orsini | G06F 21/72 |
| | | | 713/189 |
| 2014/0053261 A1 | 2/2014 | Gupta et al. | |
| 2014/0289833 A1 | 9/2014 | Briceno et al. | |
| 2014/0300554 A1 | 10/2014 | Samuel et al. | |
| 2015/0012748 A1 | 1/2015 | Jiang | |
| 2015/0113631 A1 | 4/2015 | Lerner et al. | |
| 2015/0169858 A1 | 6/2015 | Tg | |
| 2015/0178496 A1 | 6/2015 | Kohlenberg et al. | |
| 2015/0242605 A1 | 8/2015 | Du et al. | |
| 2015/0244699 A1 | 8/2015 | Hessler | |
| 2015/0317487 A1 * | 11/2015 | O'Hare | H04L 9/3231 |
| | | | 713/189 |
| 2015/0371023 A1 | 12/2015 | Chen et al. | |
| 2015/0373051 A1 | 12/2015 | Dayan et al. | |
| 2015/0379253 A1 | 12/2015 | Cook et al. | |
| 2016/0057623 A1 | 2/2016 | Dutt et al. | |
| 2016/0110528 A1 | 4/2016 | Gupta et al. | |
| 2016/0180068 A1 | 6/2016 | Das et al. | |
| 2016/0239649 A1 | 8/2016 | Zhao | |
| 2016/0300049 A1 | 10/2016 | Guedalia et al. | |
| 2016/0330244 A1 | 11/2016 | Denton et al. | |
| 2016/0366126 A1 | 12/2016 | Sharifi et al. | |
| 2016/0366183 A1 * | 12/2016 | Smith | H04L 63/06 |
| 2017/0006009 A1 | 1/2017 | Hessler | |
| 2017/0024660 A1 | 1/2017 | Chen et al. | |
| 2017/0032113 A1 | 2/2017 | Tunnell et al. | |
| 2017/0109514 A1 | 4/2017 | Cheng et al. | |
| 2017/0161478 A1 | 6/2017 | Stavrou et al. | |
| 2017/0177999 A1 | 6/2017 | Novik et al. | |
| 2017/0227995 A1 | 8/2017 | Lee et al. | |
| 2017/0293748 A1 | 10/2017 | Kurupati | |
| 2017/0364673 A1 | 12/2017 | Gupta et al. | |
| 2018/0012003 A1 | 1/2018 | Asulin et al. | |
| 2018/0032709 A1 | 2/2018 | Martin et al. | |
| 2018/0068098 A1 | 3/2018 | Finzi et al. | |
| 2018/0069867 A1 | 3/2018 | Grajek et al. | |
| 2018/0077154 A1 | 3/2018 | Smith et al. | |
| 2018/0097806 A1 | 4/2018 | Blinn | |
| 2018/0107833 A1 | 4/2018 | Gadepalli et al. | |
| 2018/0181741 A1 | 6/2018 | Whaley | |
| 2018/0183810 A1 * | 6/2018 | Jones | H04L 9/3234 |
| 2018/0232504 A1 | 8/2018 | Bradley et al. | |
| 2018/0293367 A1 | 10/2018 | Urman | |
| 2018/0375859 A1 | 12/2018 | Huh et al. | |
| 2019/0005408 A1 | 1/2019 | Tolpin et al. | |
| 2019/0034917 A1 | 1/2019 | Nolan et al. | |
| 2019/0140833 A1 | 5/2019 | Grajek et al. | |
| 2019/0236249 A1 | 8/2019 | Pavlou et al. | |
| 2019/0364027 A1 | 11/2019 | Pande et al. | |
| 2019/0386972 A1 | 12/2019 | Boutnaru | |
| 2020/0125706 A1 | 4/2020 | Adir et al. | |
| 2020/0242232 A1 | 7/2020 | Machani et al. | |
| 2020/0412528 A1 | 12/2020 | Saint et al. | |
| 2021/0076212 A1 | 3/2021 | Manikantan Shila et al. | |
| 2021/0174813 A1 | 6/2021 | Huh et al. | |
| 2021/0397683 A1 | 12/2021 | Liem et al. | |
| 2022/0012672 A1 | 1/2022 | Inman et al. | |
| 2022/0078029 A1 * | 3/2022 | Galdo | H04L 9/3265 |
| 2022/0100829 A1 | 3/2022 | Gelardi et al. | |
| 2022/0164422 A1 | 5/2022 | Gelardi et al. | |

FOREIGN PATENT DOCUMENTS

| | | |
|---|---|---|
| WO | 2012085047 A1 | 6/2012 |
| WO | 2013096944 A1 | 6/2013 |
| WO | 2014179076 A1 | 11/2014 |
| WO | 2014205148 A1 | 12/2014 |
| WO | WO-2015143066 A1 | 9/2015 |
| WO | WO-2017144768 A1 | 8/2017 |
| WO | 2018025019 A1 | 2/2018 |
| WO | 2018048427 A1 | 3/2018 |
| WO | WO-2019168383 A1 | 9/2019 |

OTHER PUBLICATIONS

Anonymous: "Multi-factor authentication—Wikipedia," Sep. 11, 2019, XP055669325, Retrieved from the Internet: URL:https://en.wikipedia.org/w/index.php?title=Multi-factor_authentication&oldid=915132363 [retrieved on Feb. 17, 2020], 11 pages.

Antal M et al., "Identity Information Revealed From Mobile Touch Gestures," Studia Universitatis Babes-Bolyai, Informatica, May 21-25, 2014, vol. LIX, 11 pages.

Blakley G.R., "Safeguarding Cryptographic Keys", National Computer Conference 1979, pp. 313-317.

Bo C., et al., "SilentSense: Silent User Identification via Dynamics of Touch and Movement Behavioural Biometrics," in MobiCom, arXiv:1309.0073v1 [cs.CR], Aug. 31, 2013, 9 pages.

Buduru A.B., et al., "An Effective Approach to Continuous User Authentication for Touch Screen Smart Devices," 2015 IEEE International Conference on Software Quality, Reliability and Security (QRS), Vancouver, BC, 2015, pp. 219-226.

Combined Search and Examination Report for Great Britain Application No. 1913201.8, mailed Jun. 3, 2020, 12 pages.

Crouse D., et al., "Continuous Authentication of Mobile User: Fusion of Face Image and Inertial Measurement Unit Data," 2015 International Conference on Biometrics (ICB), Phuket, 2015, pp. 135-142.

Damgard I., et al., "Multiparty Computation from Somewhat Homomorphic Encryption," Advances in Cryptology—Crypto 2012, Proceedings of the 32nd Annual Cryptology Conference, Santa Barbara, CA, USA, Aug. 19-23, 2012, pp. 643-662.

Extended European Search Report for Application No. 119197111.8, mailed Jun. 23, 2020, 11 pages.

Fathy M.E., et al., "Face-Based Active Authentication on Mobile Devices," 2015 IEEE International Conference on Acoustics, Speech and Signal Processing (ICASSP), South Brisbane, QLD, 2015, pp. 1687-1691.

Feng T., et al., "Continuous Mobile Authentication Using Virtual Key Typing Biometrics," 2013 12th IEEE International Conference on Trust, Security and Privacy in Computing and Communications, 2013, pp. 1547-1552.

Feng T., et al., "Continuous Mobile Authentication using Touchscreen Gestures, " Homeland Security (HST), 2012 IEEE Conference on Technologies for Homeland Security, Waltham MA, 2012, pp. 451-456.

Feng T., et al., "TIPS: Context-Aware Implicit User Identification using Touch Screen in Uncontrolled Environments", ACM HotMobile '14, Feb. 26-27, 2014, 6 pages.

(56) References Cited

OTHER PUBLICATIONS

Frank M., et al., "Touchalytics: On the Applicability of Touchscreen Input as a Behavioral Biometric for Continuous Authentication," Jan. 2013, IEEE Transactions on Information Forensics and Security, vol. 8, No. 1, XP011484631, ISSN: 1556-6013, DOI:10.1109/TIFS. 2012 .2225048, 13 pages.
Gong N.Z., et al., "Forgery-Resistant Touch-based Authentication on Mobile Devices," 11 ACM on Asia Conference on Computer and Communications Security, May 30-Jun. 3, 2016, 12 pages.
Guse, D., "Gesture-based User Authentication on Mobile Devices using Accelerometer and Gyroscope", Master Thesis, Berlin Institute of Technology, May 2011, 111 pages.
Howells G., "Security and Privacy for the Internet of Things (Spirit)", EPSRC Research Grant Details, Jan. 1, 2017, 2 pages.
International Search Report and Written Opinion for Application No. PCT/EP2020/075501, mailed on Nov. 18, 2020, 12 pages.
Li Y., et al., "Understanding OSN-Based Facial Disclosure Against Face Authentication Systems," Asia CCS'14, Jun. 4-6, 2014, pp. 413-423.
Mondal S., et al., "Swipe Gesture based Continuous Authentication for Mobile Devices," 2015 International Conference on Biometrics (ICB), Jun. 2015, pp. 458-465. (9 pages).
Pearson S., et al., "Sticky Policies: An Approach for Managing Privacy across Multiple Parties", HP Labs Bristol, Published by the IEEE Computer Society, 2011, pp. 60-68.
Roy A., et al., "An HMM-based Multi-sensor Approach for Continuous Mobile Authentication," Military Communications Conference, Milcom 2015, Track 3—Cyber Security and Trusted Computing, Tampa, FL, 2015, pp. 1311-1316.
Saevanee H., et al., "Continuous User Authentication using Multimodal Biometrics," Computers and Security, vol. 53, Issue C, Sep. 2015, 20 pages.
Samangouei P., et al., "Attribute-based Continuous User Authentication on Mobile Devices," 2015 IEEE 7th International Conference on Biometrics Theory, Applications and Systems (BTAS), Arlington, VA, 2015, 8 pages.
Serwadda A., et al., "When Kids' Toys Breach Mobile Phone Security," 2013 ACM SIGSAC Conference on Computer and Communications Security (CCS), Nov. 4-8, 2013, pp. 599-610.
Serwadda A., et al., "Which Verifiers Work?: A Benchmark Evaluation of Touch-based Authentication Algorithms," IEEE Sixth International Conference on Biometrics: Theory, Applications and Systems (BTAS), ser. BTAS'13, Sep. 2013, 8 pages.
Shamir A., "How to Share a Secret," Communications of the ACM, Nov. 1979, vol. 22, No. 11, pp. 612-613.
Shi W., et al., "SenGuard: Passive User Identification on Smartphones Using Multiple Sensors," 2011 IEEE 7th International Conference on Wireless and Mobile Computing, Networking and Communications (WiMob), Oct. 2011, pp. 141-148 (9pages).
Shirey R., Network Working Group, Request for Comments: 4949, Internet Security Glossary, Version 2, Aug. 2007, 365 pages.
Spyra G., et al., "Protecting Documents with Sticky Policies and Identity-Based Encryption", IEEE Future Technologies Conference 2016, Dec. 6-7, 2016, 5 pages.
Trojahn M., et al., "Towards Coupling User and Device Locations Using Biometrical Authentication on Smartphones", The 7th International Conference for Internet Technology and Secured Transactions (ICITST-2012), pp. 736-741.
Velten M., et al., "User Identity Verification Based on Touchscreen Interaction Analysis in Web Contexts," 11th International Conference on Information Security Practice and Experience, 2015, pp. 268-282.
Wu J S., et al., "Smartphone Continuous Authentication based on Keystroke and Gesture Profiling," The 49th Annual IEEE International Carnahan Conference on Security Technology, Sep. 21-24, 2015, pp. 191-197.
Xu H., et al., "Towards Continuous and Passive Authentication via Touch Biometrics: An Experimental Study on Smartphones," Tenth Symposium on Usable Privacy and Security, Jul. 9-11, 2014, pp. 187-198.
Yampolskiy R., et al., "Behavioural Biometrics: a Survey and Classification," International Journal of Biometrics, vol. 1, No. 1, 2008, pp. 81-113 (34 pages).
Zhang H., et al., "Robust Multimodal Recognition via Multitask Multivariate Low-Rank Representations," IEEE International Conference on Automatic Face and Gesture Recognition, 2015, 8 pages.
Zhang H., et al., "Touch Gesture-Based Active User Authentication Using Dictionaries," 2015 IEEE Winter Conference on Applications of Computer Vision, Waikoloa, HI, 2015, pp. 207-214.
Combined Search and Examination Report under Sections 17 and 18(3) for Great Britain Application No. 1903029.5, mailed Sep. 5, 2019, 6 pages.
Combined Search and Examination Report under Sections 17 and 18(3) for Great Britain Application No. 1903030.3, mailed on Aug. 28, 2019, 6 pages.
Combined Search and Examination Report under Sections 17 and 18(3) for Great Britain Application No. 1903031.1, mailed on Sep. 9, 2019, 12 pages.
Combined Search and Examination Report under Sections 17 and 18(3) for Great Britain Application No. 1903032.9, mailed on Sep. 3, 2019, 6 pages.
Combined Search and Examination Report under Sections 17 and 18(3) for Great Britain Application No. 1910169.0, mailed on Feb. 25, 2020, 10 pages.
Combined Search and Examination Report under Sections 17 and 18(3) for Great Britain Application No. 2019297.7, mailed on Sep. 1, 2021, 11 pages.
Combined Search and Examination Report under Sections 17 and 18(3) for Great Britain Application No. GB1903033.7, mailed on Sep. 9, 2019, 9 pages.
Combined Search and Examination Report under Sections 17 and 18(3) for Great Britain Application No. GB1911314.1 mailed on Nov. 27, 2019, 7 pages.
Examination Report under Section 18(3) for Great Britain Application No. GB1911314.1, mailed on Jan. 25, 2022, 3 pages.
Examination Report under section 18(3) for GB Application No. 1910169.0, mailed on Aug. 13, 2021, 4 pages.
Extended European Search Report for Application No. 19161162.3, mailed on Jun. 24, 2019, 7 pages.
Extended European Search Report for Application No. 19161164.9, mailed on Jun. 26, 2019, 9 pages.
Extended European Search Report for Application No. 19161165.6, mailed on Jun. 27, 2019, 7 pages.
Extended European Search Report for Application No. 19161166.4, mailed on Jun. 27, 2019, 9 pages.
Extended European Search Report for Application No. 19186557.5 mailed on Nov. 7, 2019, 6 pages.
Extended European Search Report for Application No. 19190589.2, mailed on Dec. 12, 2019, 9 pages.
Extended European Search Report received for European Patent Application No. 19161163.1 mailed on Jun. 24, 2019, 7 pages.
Final Office Action received for U.S. Appl. No. 17/597,629, mailed on Mar. 12, 2024, 19 pages.
International Preliminary Report on Patentability for Application No. PCT/EP2020/055367, mailed on Sep. 16, 2021, 10 pages.
International Preliminary Report on Patentability for Application No. PCT/EP2020/055369, mailed on Sep. 16, 2021, 8 pages.
International Preliminary Report on Patentability for Application No. PCT/EP2020/055370, mailed on Sep. 16, 2021, 11 pages.
International Preliminary Report on Patentability for Application No. PCT/EP2020/055371, mailed on Sep. 16, 2021, 11 pages.
International Preliminary Report on Patentability for Application No. PCT/EP2020/055372, mailed on Sep. 16, 2021, 10 pages.
International Preliminary Report on Patentability for Application No. PCT/EP2020/066598 mailed Jan. 27, 2022, 8 pages.
International Preliminary Report on Patentability for Application No. PCT/EP2021/083049, mailed on Jun. 22, 2023, 9 pages.
International Search Report and Written Opinion for Application No. PCT/EP2020/066598, mailed on Aug. 28, 2020, 11 pages.
International Search Report and Written Opinion for Application No. PCT/EP2020/055369, mailed on Jun. 9, 2020, 12 pages.
International Search Report and Written Opinion for Application No. PCT/EP2020/055370, mailed on Mar. 30, 2020, 15 pages.

(56) References Cited

OTHER PUBLICATIONS

International Search Report and Written Opinion for Application No. PCT/EP2020/055371, mailed on Mar. 30, 2020, 15 pages.
International Search Report and Written Opinion for Application No. PCT/EP2021/083049, mailed on Feb. 11, 2022, 14 pages.
International Search Report and Written Opinion for Application No. PCT/EP2020/055372, mailed Mar. 30, 2020, 14 pages.
International Search Report and Written Opinion received for PCT Patent Application No. PCT/EP2020/055367, mailed on Mar. 30, 2020, 14 pages.
Non-Final Office Action received for U.S. Appl. No. 17/310,016, mailed on Mar. 27, 2025, 17 pages.
Non-Final Office Action received for U.S. Appl. No. 17/597,629, mailed on Dec. 5, 2023, 18 pages.
Notice of Allowance received for U.S. Appl. No. 17/597,629, mailed on Oct. 16, 2024, 9 pages.
Office Action received for European Patent Application No. 20706348.8, mailed on Jul. 4, 2023, 5 pages.
Office Action received for European Patent Application No. 20706349.6, mailed on Jul. 4, 2023, 5 pages.
Office Action received for European Patent Application No. 20706350.4, mailed on Jul. 4, 2023, 5 pages.
Office Action received for European Patent Application No. 20706351.2, mailed on Jul. 4, 2023, 7 pages.
Aldosary, et al., "A Robust Multimodal Biometric Security System using the Polynomial Curve Technique within Shamir's Secret Sharing Algorithm", Emerging Security Technologies (EST), 2012, sections 1, 2, 2.1, pp. 66-69.
Crawford, "A Framework for Continuous, Transparent Authentication on Mobile Devices", PhD thesis, University of Glasgow, 2012, 209 pages. (Presented in 2 parts).
Deutschmann, et al., "Continuous Authentication Using Behavioral Biometrics", Security DARPA, ITPro, Jul./Aug. 2013, pp. 12-15.
Intego , "How to Limit Internet Access by Day and Time with Content Barrier", Retrieved from https://support.intego.32 com/hc/en-us/articles/207115178-How-to-Limit-Internet-Access-by-Day-and-Time-with-ContentBarrier, Jun. 10, 2019, 5 pages.
Kidslox, "Effectively Limit Child Screen Time With Parental Control App", Retrieved from the Internet: https://kidslox.com, Jul. 12, 2019, 4 pages.
Kidslox, "Parental Control by Kidslox", Google Playstore, Retrieved from the Internet: https://play.google.com/store/apps/details?id=com.kidslox.app&hl=en_IN, Jul. 12, 2019, 4 pages.
Lee, et al., "Implicit Smartphone User Authentication with Sensors and Contextual Machine Learning", Princeton University, arXiv: 1708.09754v1 [cs.CR], Aug. 30, 2017, 13 pages.
Li, et al., "Using Data Augmentation in Continuous Authentication on Smartphones", IEEE Internet of Things Journal, Feb. 2019, vol. 6, No. 1, pp. 628-640, doi: 10.1109/JIOT.2018.2851185.
Ometov, et al., "Multi-factor Authentication: A Survey and Challenges in V2X Applications", 9th International Congress on Ultra Modern Telecommunications and Control Systems And Workshops, (sections I, III-B, III-C, III-D, figure 1.), Nov. 6, 2017, pp. 129-136.
Rathgeb, et al., "A Survey on Biometric Cryptosystems and Cancelable Biometrics", EURASIP Journal on Information Security, vol. 2011, No. 1, Jan. 1, 2011, 25 pages.
Valero, et al., "Improving the Security and QoE in Mobile Devices Through an Intelligent and Adaptive Continuous Authentication System", Sensors, vol. 18, 3769, retrieved from https://www.mdpi.com/1424-8220/18/11/3769, Nov. 4, 2018, 29 pages.

\* cited by examiner

RESOURCE ACCESS CONTROL

PRIORITY CLAIM

The present application is a National Phase entry of PCT Application No. PCT/EP2020/075501, filed Sep. 11, 2020, which claims priority from EP Patent Application No. 19197111.8, filed Sep. 12, 2019, each which is hereby fully incorporated herein by reference.

FIELD

The present disclosure relates generally to controlling access to a resource. In particular, the present disclosure controls access to a resource based on the presence of a set of conditions under which access to the resource is permitted.

BACKGROUND

User devices, such as portable computing devices, tablet computers, smartphones, and mobile terminals have access to an ever-increasing range of resources (i.e. data and functionality) that is available, either locally through the devices themselves, or via communication with other computer systems via various networks. At the same, due to the increasingly mobile nature of such devices, the range of situations in which such devices may be used to access those resources has also increased. This gives rise to the possibility that certain resources may be used in situations in which use of those resources is inappropriate.

Numerous different types of access control mechanisms have previously been used to regulate access to resources according to certain conditions. Examples include Mandatory Access Control (MAC), Discretionary Access Control (DAC), Role-Based Access Control (RBAC) and Attribute Based Access Control (ABAC).

SUMMARY

These conventional access control mechanisms all generally operate under the assumptions that: (a) the factors on which the decision is based are relatively static; and (b) the duration of access to the resource is relatively short (at least compared to the time scales over which the factors tend to change). This is generally the case because these access control mechanisms tend to operate as part of a software application to control different users' access to (or permitted actions with respect to) various data items within the software application. As such, whenever access is requested to a resource, these access control mechanisms typically evaluate whether access can be granted based on various factors and then either grant or deny access to the resource.

By contrast, the present disclosure is concerned with access control to resources by computing devices, such as those discussed above, rather than by entities within a software application. However, the conditions under which a computing device operates can change rapidly, especially as they become increasingly mobile. For example, it may be desired to limit access to a resource to a computing device when it is within a particular geographical area, such a user's home. However, this condition might frequently and/or rapidly change as a user leaves and returns to their home during the course of a typical day. Furthermore, access to various resources from such devices may be ongoing or at least relatively long-term (at least compared to the time scales over which the device's situation can change). For example, data stored on the device and hardware functionality, such as access to a camera or access to networks such as the Internet, may be continually (or at least generally) available.

It is therefore desirable to overcome such problems with the known access control mechanisms when controlling access to resources in computing devices.

According to a first aspect of the present disclosure, there is provided a computer-implemented method for accessing a resource, wherein access to the resource is protected by a secret key, the method comprising, at a computing device: receiving a policy indicating a set of conditions under which access to the resource is permitted, wherein the policy indicates how a set of shares representing the secret key in accordance with a secret sharing scheme can be generated based on an output of one or more sensors of the computing device; determining whether each of the conditions are initially present based on the output of the one or more sensors; and monitoring the one or more sensors to detect a change in the presence of one or more conditions of the set of conditions; determining whether each of the conditions are present in response to detecting the change in the presence of the one or more conditions; enabling access to the resource in response to determining that each condition of the set of conditions is present, comprising: obtaining a copy of the secret key by generating the set of shares from the output of the one or more sensors as indicated by the policy and creating the copy of the secret key based on the generated set of shares in accordance with the secret sharing scheme; using the copy of the secret key to access the resource; and preventing access to the resource in response to determining that at least one condition of the set of conditions is not present by erasing any copies of the secret key.

The present disclosure provides an event-driven policy application mechanism that allows the provision of access to resources to adapt in response to changes in the conditions under which the device is operating. This is achieved by monitoring the one or more sensors to detect a change in the presence of each of the conditions indicated by the policy. This means that access to a resource can be enabled or prevented as appropriate to reflect the current risk level of the computing device as the circumstances within which it is operating changes over time. By tying the generation of the secret key to the output of one or more sensors of the computing device, the correct key can be generated by the computing device when the output of the one or more sensors matches the output that would be expected when the conditions indicated by the policy are fulfilled. However, if the output of the one or more sensors differs from that which would be expected if the conditions indicated by the policy were present, the copy of the secret key that is recreated will likely be incorrect and access to the resource will be prevented.

The policy may indicate a plurality of sets of conditions under which access to the resource is permitted. Access to the resource may be enabled in response to determining that each of the conditions in at least one of the sets of conditions are present and may be prevented in response to at least one condition being absent from each of the sets of conditions.

By allowing a policy to indicate a plurality of sets of conditions under which access to the resource is permitted, the present disclosure improves the granularity with which access to the resource can be controlled. This is because access to the resource can be granted if any of the sets of conditions is present and can continue to be provided if at least one of the sets of conditions continues to be present.

The resource may comprise an item of data, wherein an encrypted version of the item of data is accessible by the computing device. Enabling access to the resource may further comprises recreating a copy of the item of data by using the copy of the secret key to decrypt the encrypted version of the item of data and preventing access to the resource may further comprise erasing the recreated copy of the item of data.

Where the resource is an item of data, encrypting the resource can help prevent access to the resource except when the set of conditions indicated by the policy as being required to access the resource is present.

The method may be performed by an isolated process executing according to a trusted computing environment of the computing device.

The use of an isolated process to perform the method can help to prevent the policy from being circumvented by tampering with, or otherwise compromising, the processing required to access the resource. For example, where a secret key is used to decrypt the resource, the isolated process can help prevent the key from being exposed to other processes running on the computing device (such as processes that might be run in order to observe the memory used by the process to attempt to compromise the secret key, which would then potentially allow uncontrolled access to the resource).

The set of conditions may comprise one or more conditions that are related to the computing device's environment. The one or more conditions related to the computing device's environment may be based on one or more of: a light level; a geographical-location; a noise level; connectivity to a particular network; a speed; and an altitude.

The set of conditions may comprise one or more conditions that are related to a user of the computing device. The one or more conditions related to the user may be based on one or more behavioral biometrics of the user.

According to a second aspect of the present disclosure, there is provided a computer-implemented method for controlling access to a resource by a computing device, the method comprising: receiving an indication of a set of conditions under which access to the resource is permitted; determining a secret key to be used to protect access to the resource; determining a set of values that correspond to respective values that would be measured by one or more sensors of the computing device when the set of conditions is present; generating a plurality of shares representing the secret key in accordance with a secret sharing scheme; generating, for each of the plurality of shares, a representation of that share in terms of at least one of the set of values; and providing a policy comprising the representations of each of the plurality of shares to the computing device.

By generating the representations of the shares in terms of the set of values that would be expected to be measured by one or more sensors of the computing device when the required set of conditions is present and then providing those representations as part of the policy that is provided to the computing device for accessing a resource, the method effectively ties the generation of the secret key for accessing the resource to the sensor values that are associated with the set of conditions under which access to the resource is permitted. Accordingly, if the conditions are present at the computing device when the computing device attempts to access the resource, the computing device will be able to correctly generate the plurality of shares and thereby generate the correct secret key. However, if the conditions are not present at the computing device, the output of the one or more sensors will likely be different from that required to correctly generate the plurality of shares and the computing device is unlikely to be able to generate the correct secret key, thereby preventing access to the resource.

The resource may comprise an item of data and the method may further comprise: encrypting the item of data using the secret key to create an encrypted version of the item of data; and providing the encrypted version of the item of data to the computing device.

According to a third aspect of the present invention, there is provided a computer system comprising a processor and a memory storing computer program code for performing the method set out above.

According to a fourth aspect of the present invention, there is provided a computer program which, when executed by one or more processors, is arranged to carry out the method set out above.

BRIEF DESCRIPTION OF THE DRAWINGS

Embodiments of the present disclosure will now be described by way of example only, with reference to the accompanying drawings, in which.

DETAILED DESCRIPTION

Figure 1:
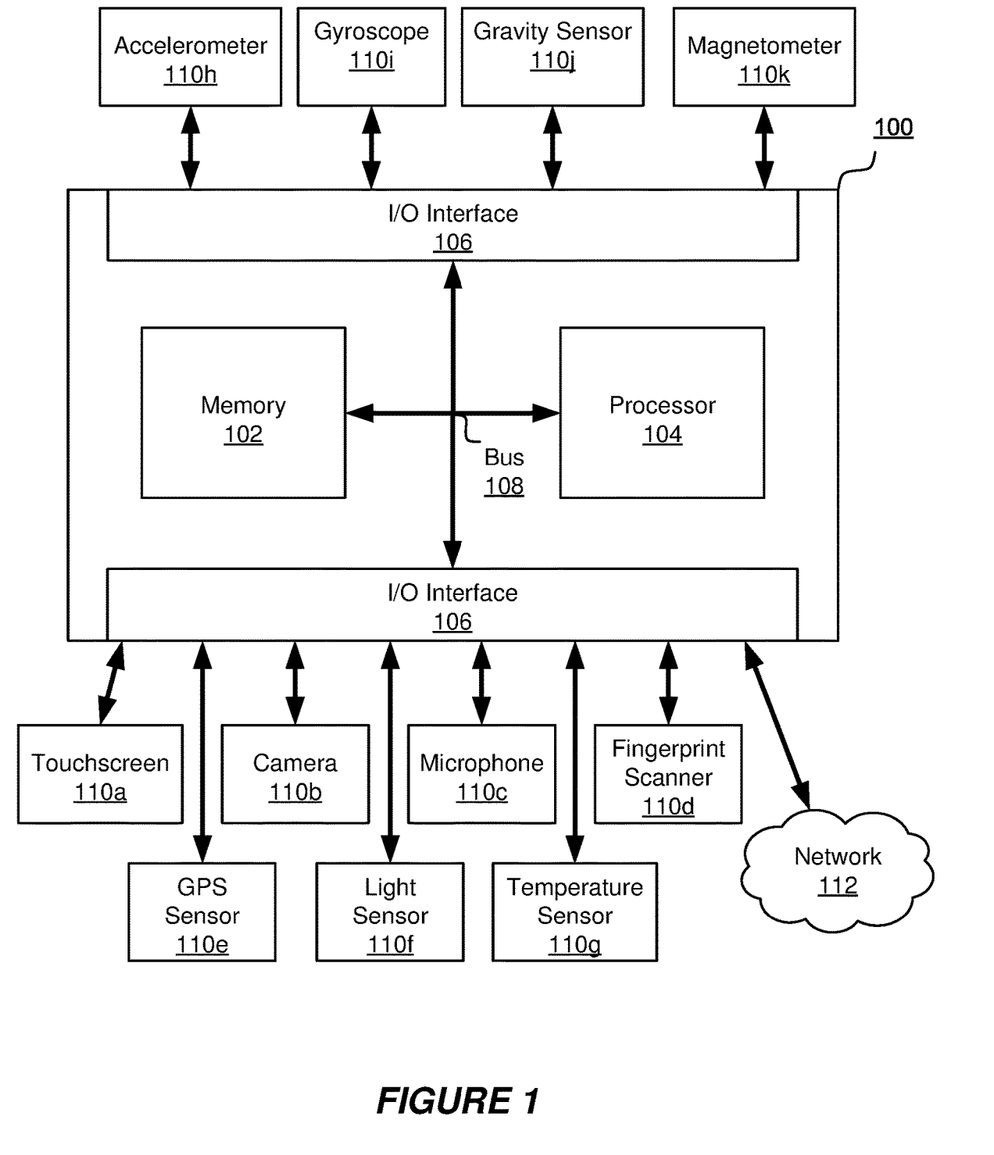
FIG. 1 is a block diagram of a computing device that is suitable for the operation of embodiments of the present disclosure.

FIG. 1 is a block diagram of a computing device (or computer system or device) 100 that is suitable for the operation of embodiments of the present disclosure. The device 100 comprises a memory (or storage) 102, a processor 104 and one or more input/output (I/O) interfaces 106, which are all communicatively linked over one or more communication buses 108.

The memory (or storage or storage medium) 102 can be any volatile read/write memory device such as random access memory (RAM) or a non-volatile memory device such as a hard disk drive, magnetic disc, optical disc, ROM and soon. The memory 102 can be formed as a hierarchy of a plurality of different memory devices, including both volatile and non-volatile memory devices, with the different memory devices in the hierarchy providing differing capacities and response times, as is well known in the art.

The processor 104 may be any processing unit, such as a central processing unit (CPU), which is suitable for executing one or more computer programs (or software or instructions or code). These computer programs may be stored in the memory 102. During operation of the system, the computer programs may be provided from the memory 102 to the processor 104 via the one or more buses 108 for execution. One or more of the stored computer programs are computer programs which, when executed by the processor 104, cause the processor 104 to carry out a method according to an embodiment of the disclosure (and accordingly configure the system 100 to be a system 100 according to an embodiment of the disclosure). The processor 104 may comprise multiple processing cores, either contained in a single chip or distributed across multiple chips (i.e. the processor 104 may be a multiprocessor), as is known in the art.

The one or more input/output (I/O) interfaces 106 provide interfaces to devices 110 for the input or output of data, or for both the input and output of data. The devices that are connected to the system 100 via the interfaces 106, interfaces 106 may include one or more devices that are intended to either obtain input from a user or provide input to a user, or both. For example, a touchscreen 110a may be connected to the system 100 to provide information to the user via images output to the touchscreen's display and allow the user to provide input by touching or swiping different points on the touchscreen 110a. However, in alternative embodiments, the touchscreen may be replaced by, or augmented with one or more of: a keyboard, a mouse, a number pad and a non-touchscreen display. The devices 110 that are attached to the system 100 via the I/O interfaces may further include one or more sensors that provide an input based on sensed parameters of the physical environment in which the system 100 is operating. For example, the devices 110 may include one or more of: a camera 110b, a microphone 110c, a fingerprint scanner 110d, a GPS sensor 110e, a light sensor 110f, a temperature sensor 110g, an accelerometer 110h, a gyroscope 110i, a gravity sensor 110j and a magnetometer 110k. Any other sensor may be used instead or in addition, as will be appreciated by those skilled in the art. The one or more input/output (I/O) interfaces 106 may further include one or more network interfaces to enable the computer system 100 to communicate with other computer systems via one or more networks 112. As will be appreciated, any suitable type of network 112 may be utilised utilized by computer system 100 to communicate with other computer systems, including communication via both wired and wireless media, such as, for example, Bluetooth, Wi-Fi or mobile communications networks.

It will be appreciated that the architecture of the system 100 illustrated in FIG. 1 and described above is merely exemplary and that other computer systems 100 with different architectures (such as those having fewer components, additional components and/or alternative components to those shown in FIG. 1) may be used in embodiments of the disclosure. As examples, the computer system 100 could comprise one or more of a personal computer; a laptop; a tablet; a mobile telephone (or smartphone); an Internet of Things (IoT) device; and a server. The devices 110 that interface with the computer system 100 may vary considerably depending on the nature of the computer system 100 and may include devices not explicitly mentioned above, as would be apparent to the skilled person.

Figure 2:
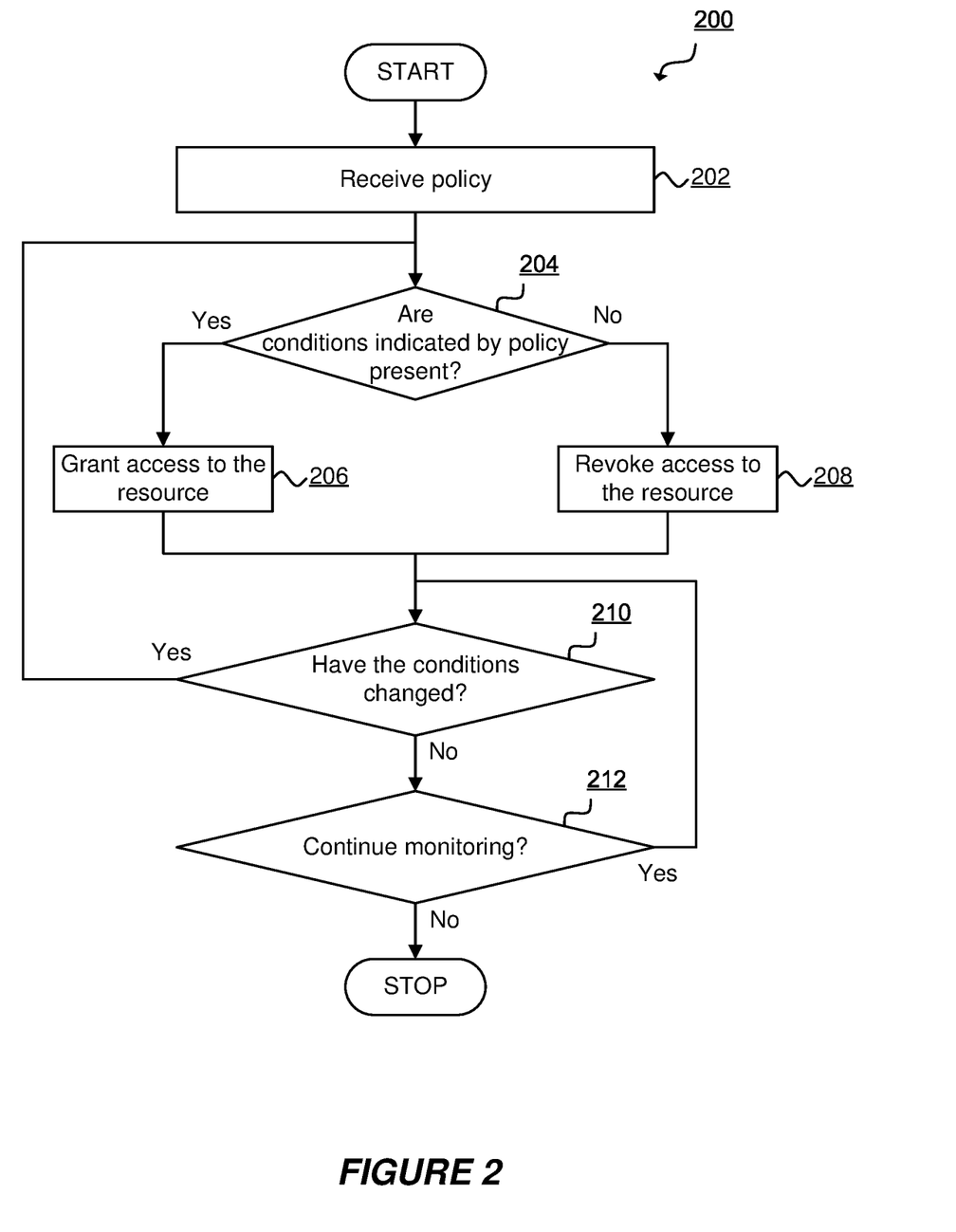
FIG. 2 is a flowchart that schematically illustrates a computer implemented method for accessing a resource, in accordance with embodiments of the present disclosure.

FIG. 2 is a flowchart that schematically illustrates a computer implemented method 200, such as may be performed by computing device 100, for accessing a resource, in accordance with embodiments of the present disclosure.

In some embodiments, the resource comprises an item of data (or digital asset) that the computing device 100 can access. The item of data can either be stored locally in the memory 102 of the computing device 100 or be retrievable by the computing device 100 from another computer system via a network 112 that the computing device has access to. For example, the item of data may be a data file belonging to the user. As a further example, the item of data may be a credential, such as a certificate or secret key belonging to the user.

In some embodiments, the resource may additionally or alternatively comprise a service that the computing device 100 can access. In some cases, this service may be provided locally on the computing device 100 itself, such as through an application that is running on the computing device. For example, the service may comprise a password vault or store which provides access to a user's credentials for other services. As a further example, the service may comprise a network service that enables communication with a network. In other cases, the service may be a remotely hosted service that is accessible via a network that the computing device 100 has access to.

Of course, it will be appreciated that where the resource that is being controlled is a service, access to that resource may be controlled in turn by controlling access to a credential that is required in order to use the service. For example, access to a service may require authentication, which can be effected using a credential, such a certificate, secret key or password. This credential may be stored as an item of data on the computing device, which is accessed and used as needed in order to access the service (for example by completing an authentication process using the credential). Therefore, conceptually, access to the service may, in such cases, be indirectly achieved by controlling access to the credential that is stored as an item of data.

The method 200 starts at an operation 202. At operation 202, the method 200 receives a policy relating to the resource being accessed. The policy indicates a set of conditions under which access to the resource is permitted. That is to say, a set of conditions which must be present (or satisfied) in order for the resource to be accessed.

In some embodiments, the conditions relate to the environment in which the device is being operated. As examples:
a.) a policy may require a certain level of light in order for a resource to be accessed, thereby preventing access to the resource in a dark room (such as a bedroom at night time);
b.) a policy may require the device 100 to be operating in a certain geographical area in order to access a resource (such as being in a particular building, such as a home or an office), thereby preventing access to the resource if the device is outside of that geographical area;
c.) a policy may require a certain level of background noise in order for a resource to be accessed (such as requiring a quiet environment or, alternatively, requiring a noisy environment), thereby preventing access to the resource if this level is not met;
d.) a policy may require that the device is connected to a particular network in order for a resource to be accessed (such as being connected to an office or home network), thereby preventing access to the resource if it is not connected to that network;
e.) a policy may require that the device is being operated under a certain speed in order for a resource to be accessed, thereby preventing access to the resource if that speed is exceeded (such as whilst travelling in a car);
f.) a policy may require that the device is being operated under a certain altitude in order for a resource to be accessed, thereby preventing access to the resource if that altitude is exceeded (such as whilst flying in a plane).

In some embodiments, the conditions relate to the user of the device. For example, the conditions may require that a certain user is using the device in order for a resource to be accessed. Therefore, the conditions may require that the device is operating under the account of that user and, possibly, that the user has successfully been authenticated by the device within a certain time frame. Similarly, the conditions may require that the user has been authenticated by a specific mechanism, such as through the use of multi-factor authentication, or that a particular authentication factor was used, such as the provision of a physiological biometric (e.g. a fingerprint or facial recognition).

Behavioral biometrics can also be used to determine information about the current user of a device. Behavioral biometrics are based on the idea that various features of a user's behavior when carrying out different activities are relatively invariant. That is to say, whenever a particular activity is being carried out by the user, the same features are highly likely to be present. Such activities may involve the user interacting with a device, such as by swiping or tapping a touch screen, typing on a keyboard or moving a mouse. Other activities may be unrelated to interaction with the device, but can be sensed by the device when it is carried by the user, such as walking or speaking. Because behavioral biometrics can be detected from a user's normal activities, they can be continuously or regularly monitored. Therefore, through the use of behavioral biometrics, information about a current user of the device can be detected, even if a user other than a user who authenticated with the device has started using the device.

As will be appreciated, there are a wide range of behavioral biometrics which can be detected through the various sensors that the computing device 202 has access to. For example, touchscreen interactions, including gestures such as swipes, strikes, pinches, scrolls and/or taps, may be sensed via a touchscreen 110a of the device 100. The data provided by the touchscreen 110a may therefore yield various features that can help to distinguish a particular user from other users. Such features are considered to be behavioral biometrics. For example, the pressure applied, stroke length and/or duration of any touchscreen interactions may be measured and are likely to be different for different users, yet consistent for a particular user. Other sensors may yield other behavioral biometrics, for example sensors such as an accelerometer 110h, gyroscope 110i, gravity sensor 110j and/or magnetometer 110k can be used to determine other distinguishing features of a particular user, such as their gait, or the way in which they hold their phone (e.g. a typical device orientation). A camera 110b of the device may also provide behavioral biometrics, for example, associated with movements or facial expressions or features of a user as they interact with the device. As a further example, tapping or typing patterns on a keyboard (either virtual or physical) may be monitored and behavioral biometrics relating to these patterns (which may be referred to as keystroke dynamics) can be used. Similarly, the semantic content of data entered into the computing device 202 (whether by virtual or physical keyboard, voice, or in any other way), may be analysed to determine linguistic behavioral biometrics relating to patterns in the language that is used by the user to express themselves (for example, frequencies of use of different words). All these features are considered to be behavioral biometrics.

Although individual behavioral biometrics may be common to lots of users, by combining multiple behavioral biometrics, individual users can be identified (with a high probability). For example, there may be many users which have the same typing rate, but fewer users are likely to have the same typing rate and touch the touchscreen 110a of the device 100 with a particular pressure, with the likelihood typically decreasing as additional behavioral biometrics are also considered. Therefore, behavioral biometrics can be used to identify a particular user. It has also been suggested that users which share a particular characteristic, such as being above or below a certain age or of a particular sex (i.e. members of a particular cohort), will also exhibit particular behavioral biometrics. This means that behavioral biometrics can also be used to determine whether the user belongs to a particular cohort, without necessarily having to identify the user.

Accordingly, in some embodiments, the conditions are based on one or more behavioral biometrics of the user, thereby allowing the policy to require that the current user of the device meets certain criteria (such as being a particular person, or a person with a particular characteristic, such as being above a particular age) before permitting access to the resource.

As will be appreciated, when using behavioral biometrics, it is necessary to generate the measurements of the behavioral biometrics in a manner which yields relatively repeatable results and yet still provides some utility for distinguishing particular users (or users having a particular characteristic) from other users. The skilled person would be readily familiar with techniques for doing this. For example, the granularity (or accuracy) with which each of the behavioral biometrics is measured may be lowered to ensure that repeated measurements are likely to provide the same result at the level of granularity that is chosen. Similarly, measurements may be classified into broader categories that the measurements belong to, and each such category may be associated with a particular value. Additionally or alternatively, normalisation techniques may be used to normalize the data that is provided by the sensors. For example, multiple measurements of a particular feature may be averaged to provide an average measurement for that feature (such as an average speed of touch, or an average length of stroke and so on). Similarly, data from other sensors may be used to normalize the data that is read from another sensor (e.g. data from a gravity sensor 110j may be used to normalize data from an accelerometer 110h so that it is relative to a "real world" coordinate system rather than being relative to the computing device 100). The skilled person would be readily familiar with these, as well as other, techniques that may be used to ensure that the measurements of the behavioral biometrics are captured in a manner which is repeatable.

In some embodiments, the manner in which the behavioral biometrics are to be generated (or captured) is predetermined. For example, the device can use a standardized set of parameters and associated techniques to take measurements of the behavioral biometrics. However, in other embodiments, the policy further includes an indication of how the measurements of one, or more, or all, of the behavioral biometrics is to be generated (or captured). For example, the policy may specify a level of granularity for measurements taken from different sensors of the computing device. Similarly, the policy may specify parameters for a classifier to be used in generating a classification from the output from different sensors of the computing device that is based on the behavioral biometrics.

For some policies, the indicated set of conditions may simply consist of a single condition that is required to access the resource (such as requiring a certain light-level to access the resource). However, other policies may place more refined constraints on accessing the resource by indicating multiple conditions in the set of conditions that are required to access the resource. Access to the resource is only permitted if all of the conditions in the set of conditions are satisfied (i.e. are present).

In some embodiments, the policy includes multiple sets of conditions under which the resource is permitted to be accessed, which may be referred to herein as a composite policy. Accordingly, if at least one of the sets of conditions indicated by the composite policy are completely satisfied (that is to say, all conditions in that set are present), access to the resource is permitted regardless of whether any of the sets of conditions are completely satisfied. Therefore, a composite policy may be more flexible. For example, a policy could specify that access to a particular resource is allowed whenever a particular user is using the device (regardless of the device's location) or whenever the device is being used in a particular location (regardless of the user of the device). Of course, other examples of the use of composite policies will be readily apparent to the skilled person.

A computing device 100 operating according to the present disclosure may, in some embodiments, receive multiple policies. For example, where a device has access to multiple resources, a different policy can be specified in respect of each resource. Access to each resource is then dependent on the set (or sets) of conditions specified in the relevant policy for that resource. Additionally, in some embodiments, multiple policies may be specified in respect of a particular resource. Conceptually, this may be considered to be equivalent to the composite policies described above in so far as access to that resource may then be permitted provided that the set (or sets) of conditions specified by at least one of the policies for the resource are present.

Although this description considers policies in a positive sense—that is to say, a policy is described as specifying a set of conditions under which access to a resource is to be enabled (or permitted)—it will be appreciated that it is equally anticipated that negative policies may also be used in some embodiments. By a negative policy it is meant a policy in which the indicated set of conditions specify the set of conditions under which access to a resource is to be prevented (or refused). For example, a negative policy can be considered to specify that access to a resource is to be enabled (or permitted) under all conditions, except those indicated. Alternatively, in some embodiments, the two different types of policies may be combined, for example to specify a set (or sets) of conditions under which access to the resource should be enabled and a set (or sets) of conditions under which access to the resource should be prevented. In such embodiments, access to the resource may only be permitted if at least one of the sets of conditions under which access to the resource should be enabled is entirely present and provided that none of the sets of conditions under which access to the resource should be prevented are also entirely present. These two different types of policies may be specified separately, in their own policies, such that there are multiple policies relating to a particular resource, some of which are positive policies and some of which are negative policies. Alternatively, the two different types of policies may coexist within a single composite policy.

Of course, as will be appreciated by those skilled in the art, the discussion of the policies in this description is generally considered in a relatively atomic manner. That is to say, with a single policy relating to a single resource. However, it will be appreciated that these policies may be aggregated into a larger aggregated policy which specifies many sets of conditions under which many different resources can be accessed. Therefore, the policy that is received at operation 202 may be derived from a larger aggregated policy by extracting the set (or sets) of conditions that are indicated as being necessary for access to a particular resource to be permitted.

The policy is received from a repository of policies which is configured to store policies that are in force for the resources that the computing device has access to. This repository may be referred to as a Policy Access Point (or PAP). In some embodiments, this repository is remote from the computing device 100, such that the policies are provided from the repository to the computing device 100 via a network 112. The use of a remote policy repository can act as a centralized point at which policies can be defined, stored and updated, thereby simplifying the task of administering the policies and helping to ensure that the correct policies are consistently applied by the computing devices that are linked to (i.e. receive policies from) the repository. However, in other embodiments, this repository is stored locally in the memory 102 of the computing device 100. Accordingly, the relevant policy for accessing the resource may be retrieved from the memory 102 at operation 202. This can allow for offline operation of the disclosure, in cases where computing device 100 cannot connect to any form of network.

In such embodiments, the policies can be specified and updated locally on the computing device 100 itself. In yet other embodiments a hybrid repository may be used, such that policies can be retrieved either from a locally stored repository or a remote repository. In such embodiments, the locally stored repository can act as a cache for the remote repository, such that policies that are provided by the remote repository are cached in the local repository. This means that the computing device 100 can access the policies from the local repository instead of the remote repository, for example where the remote repository is currently inaccessible or where accessing the remote repository would be too slow. Maintaining the policies that are stored in the local cache can be done in either a lazy or a proactive fashion. For example, when following a lazy approach, the computing device 100 might ordinarily rely on the remote repository to retrieve policies and then store them in the cache so that they can be used later in situations where the remote repository is inaccessible. Similarly, when following a proactive approach, for example, the computing device 100 might periodically (or regularly) receive updates from the remote repository about the policies that are currently relevant to the device. These updates can either be requested periodically (or regularly) by the computing device (a so-called "pull" approach) or sent by the remote repository in response to any changes to the stored policies (a so-called "push" approach). The computing device 100 may then routinely retrieve the policies from the local cache as an authoritative source of the current policies to be applied to the device.

Of course, it will be appreciated that, in some embodiments, multiple remote repositories may be accessed by the device in order to obtain the policies that are relevant to accessing different resources on the device. For example, policies for accessing a first resource that the computing device 100 can access may be retrieved from a first repository, whilst policies for accessing a second resource may be retrieved from a second repository. As another example, a first repository might provide a first set of policies for the computing device, whilst a second repository might provide a second set of policies for the computing device—in such an example, the set of policies for the computing device may represent a set of default policies, such as may be provided by a service provider, whilst the second set of policies may be a set of policies which serve to customize the default policies for a particular device, such as by including additional policies for particular resources which either augment or restrict the sets of conditions specified by the default policy for that resource provided by the first repository.

In summary, at operation 202 a policy relating to the resource being accessed is received by the computing device 100. The method 200 then proceeds to an operation 204.

At operation 204, the method 200 determines whether each of the conditions are present based on an output of one or more sensors of the device. In other words, the computing device 100 uses the policy to determine which measurements are needed from which sensors in order to determine whether the set of conditions are present, obtains current measurements (i.e. outputs) from those sensors and uses those measurements to determine whether each of the conditions is present. As examples (each example continuing the correspondingly lettered example discussed in relation to the previous operation 202):

a.) the computing device 100 may determine that the output from a light sensor 110f is needed in order to determine the presence of a condition relating to the level of light;

b.) the computing device 100 may determine that the output from a GPS sensor 110e is needed in order to determine the presence of a condition relating to the geographical location;

c.) the computing device 100 may determine that the output from a microphone 110c is needed in order to determine the presence of a condition relating to the background noise;

d.) the computing device 100 may determine that the output from a network interface 106 is required to determine the presence of a condition relating to connectivity to a particular network;

e.) the computing device 100 may determine that the output from a GPS sensor 110e is needed in order to determine the presence of a condition relating to the speed at which the device is moving; and f.) the computing device 100 may determine that the output from an altimeter, such as a barometric pressure sensor, is needed in order to determine the presence of a condition relating to an altitude at which the device is operating.

Similarly, where the policy comprises conditions that are related to the user, such as those that are based on the user's behavioral biometrics, the computing device determines what sensory outputs are needed in order to determine whether those conditions are present. For example, where a policy indicates a set of conditions that include conditions relating to a user's gait, the computing device 100 may determine that output is needed from an accelerometer 110h, gyroscope 110i, gravity sensor 110j and/or magnetometer 110k in order to detect the presence of those conditions.

In some embodiments, the sensors whose output is needed in order for the condition to be satisfied may be explicitly indicated by the policy. For example, the policy may indicate that a condition for accessing the resource is that a geographical location of the device as determined by a GPS sensor is within a certain geographical area. However, in other embodiments, the device 100 may be permitted to use any appropriate sensor to make the determination. For example, if a GPS signal is not currently available (e.g. if GPS is disabled on the computing device), the device 100 may make use of other sensory output to determine if the condition is present, such as by using detected signal strengths of Wi-Fi stations and/or mobile cell base stations to determine whether the device's location is within the required geographical area.

The output from the sensors may require some processing in order to determine whether the condition is met. For example, the output may be converted to a measurement at a lower level of granularity, or may need to be categorized, or may need normalising, in order to determine whether the condition is met. This may be particularly so when considering conditions relating to behavioral 1 biometrics, as discussed above.

In some embodiments, the conditions in the policies are specified at a relatively high level. For example, a condition may be simply that a particular user is the current user using the computing device 100. Accordingly, a relatively large amount of processing may be required by the computing device 100. For example, the computing device 100 may process the output from a large number of sensors to determine numerous behavioral biometrics for the current user of the device. The computing device 100 may then carry out additional processing on the behavioral biometrics to determine an identity of the current user, such as by using a trained machine-learned classification model to classify the behavioral biometrics as belonging to a particular user. Similarly, an indication of the user that is currently authenticated to the computing device 100 may be obtained from an authentication module of the computing device 100. The authenticated user will have been determined by the authentication module using an authentication mechanism involving various authentication factors received by the computing device 100 via its sensors.

The module 100 of the computing device that determines whether the conditions specified by the policies are met may be referred to as a Policy Decision Point (or PDP). The PDP may, for example, be a software module residing on the computing device 100.

In summary, at operation 204, it is determined whether each of the conditions in the set of conditions indicated by the policy is present. If all of the conditions are determined to be present, the method 200 proceeds to an operation 206. However, if any of the conditions are determined to be absent (i.e. if at least one of the conditions is not present), the method 200 proceeds to an operation 208.

At operation 206, the method 200 enables (or grants or allows or permits) access to the resource. As discussed above, this operation is only performed once it has been determined (during operation 204) that all the conditions in a set of conditions specified by the policy have been met. Where the policy indicates multiple sets of conditions, only one set of conditions needs to be satisfied (i.e. with each condition in the set being present) in order for the method 200 to grant access to the resource. That is to say, access to the resource is granted when at least one of the sets of conditions is present (or satisfied).

At operation 208, the method 200 prevents (or revokes or disables or refuses) access to the resource. As discussed above, this operation is only performed once it has been determined (at operation 204) that at least one of the conditions in the set of conditions indicated by the policy is not present (i.e. is absent). Where the policy indicates multiple sets of conditions, operation 208 is performed if at least one of the conditions in each of the sets of conditions is absent. That is to say, access to the resource is prevented when none of the sets of conditions is completely satisfied.

In order to control access to the resource (either to enable access to the resource at operation 206 or prevent access to the resource at operation 208), the computing device includes a module, such as a software module, which may be referred to as a Policy Enforcement Point (or PEP).

In some embodiments, the PEP is integrated with (or otherwise configured to coordinate with) an operating system of the computing device 100 to prevent or enable access to the resource through the computing device's operating system.

For example, where the resource is an item of data, the PEP can be integrated with the file system to control whether that item of data can be accessed. This means that when the user tries to access that item of data, the PEP may interact with the file system to permit access to the resource if the set of conditions in a policy associated with that resource have been satisfied. Otherwise, the PEP may interact with the file system to prevent access to that resource through the file system if the set of conditions have not been satisfied.

Similarly, where the resource is a local service, the PEP can be integrated with other software modules in the operating system (or indeed software components that run on the operating system) which are responsible for providing access to that service. For example, the PEP can be integrated with hardware driver modules, such as a network driver module or a camera driver module, in order to control whether the functionality (i.e. services) provided by those hardware can be accessed based on whether the conditions indicated by an associated policy have been entirely satisfied. Where the resource is a remote service accessible to the computing device 100 via a network 112, the PEP can control access to such resources through integration with the network driver (or alternatively with a browser application for web-based services) by enabling or preventing communication with endpoints (such as IP addresses) that are associated with that service.

Where the resource is a remote service, the PEP may instruct the remote service to enable the computing device. In particular, when the PEP is implemented in a secure computing environment, such as operating within an enclave which supports remote attestation, as discussed further below, the remote service can verify that the PEP is operating correctly (that is, in an expected manner) and can therefore trust the PEP to provide an accurate indication as to whether access to the resource should be enabled.

In other embodiments, the resource is protected by a secret key and the PEP provides access to the resource by making the secret key available for use in accessing the resource. Conversely, the PEP can prevent access to the resource by not providing the secret key (or by providing an incorrect version of the secret key). For example, in some embodiments, where the resource is a service (whether local or remote to the computing device), the service may require the secret key to be provided in order for the service (resource) to be accessed. In other embodiments, where the resource is an item of data, the secret key is a cryptographic key that is required in order to decrypt an encrypted version of the item of data. As such, the computing device will only be able to access the item of data when it has access to the secret key.

In some embodiments, the secret key is simply stored in a location that is accessible to the PEP. In particular, when the PEP is implemented in a secure computing environment, the key may be stored in a memory enclave that is only accessible to the PEP (although, of course, the use of a secure computing environment with such embodiments is not strictly necessary).

However, in other embodiments, the secret key is be generated by combining the output from the sensors of the computing device in a manner that is indicated by the policy. This technique for generating the key from the output of the sensors will be discussed further in relation to FIG. 3 below. Using this technique, the secret key will be correctly generated if the output from the sensors corresponds to a set of conditions required by the policy being present. However, if the output from the sensors does not correspond to a set of conditions required by the policy being present, the technique results in an incorrect version of the secret key being generated. Accordingly, in such embodiments, operations 204, 206 and 208 may essentially be combined into a single operation in which the secret key is generated. The granting or revoking of access to the resource is then implicitly provided through the generation of either a correct key (if the set of conditions are present) or an incorrect key (if the set of conditions are not present).

In summary, following operation 204, the method 200 either enables access to the resource at operation 206 when each of the conditions indicated by the policy is present, or otherwise prevents access to the resource at operation 208. The method 200 then proceeds to an operation 210.

At operation 210, the method 200 monitors the one or more sensors to detect a change in the conditions. As discussed in relation to operation 204, these sensors are the sensors from which measurements are needed in order to determine whether the set of conditions specified by the policy are present. Accordingly, a change in the measurements from the sensors will indicate a change in the device's current operating conditions and may therefore require the state of access to the resource to be changed according to the conditions required by the policy. Therefore, in response to detecting a change in the conditions, the method 200 repeats operation 204 to determine whether the conditions required to access the resource under the policy have been met. Conceptually, these operations 210 and 204 may be combined, such that operation 210 monitors the output from the sensors to determine a change in the presence of a condition required by the policy. That is to say, the computing device 100 may determine whether a previously absent condition is now present or whether a previously present condition is now absent. The computing device 100 can then toggle access to the resource, such that access to the resource is revoked if it was previously granted but a previously present conditions is now absent, or access to the resource is granted if it was previously prevented but the previously absent conditions are now present, provided that no previously present condition is now absent. Of course, by monitoring the presence of the conditions in this manner, the determination that each of the conditions is present can be implicitly determined. That is to say, by monitoring all of the conditions for a policy, the detection that any of the conditions is absent implicitly determines that that the set of conditions for that policy are not present, without needing to re-evaluate all of the conditions.

As examples (each example continuing the correspondingly lettered example discussed in relation to the operation 204):

a.) a change in output from a light sensor 110*f* indicates a change to the level of light, which may in turn result in a change to the presence of a condition of the policy relating to the level of light required;

b.) a change in the output from a GPS sensor 110*e* indicates a change to the geographical location, which may in turn result in a change to the presence of a condition of the policy relating to the geographical location;

c.) a change in the output from a microphone 110*c* indicates a change to the level of background noise, which may in turn result in a change to the presence of a condition of the policy relating to the level of background noise;

d.) a change in the output from a network interface 106 can indicate a change in connectivity to a particular network, which may in turn result in a change to the presence of a condition of the policy relating to connectivity to a particular network;

e.) a change in the output from a GPS sensor 110e can indicate a change in the speed at which the device is moving, which may in turn result in a change to the presence of a condition of the policy relating to the speed at which the device is moving; and f.) a change in the output from an altimeter indicates a change in altitude, which may in turn result in a change to the presence of a condition of the policy relating to the altitude at which the device is operating.

Similarly, for example, the output from a continuous authentication mechanism, such as one that is based on monitoring a user's behavioral biometrics, may be monitored to detect changes in the identity of a current user of the device.

In embodiments where the policy comprises multiple sets of conditions, the monitoring that is performed at operation 210 may, in some such embodiments, monitor the conditions associated with all of the sets of conditions. Accordingly, in some situations a detected change in the conditions need not necessarily lead to the state of access being toggled (i.e. revoked if it is current enabled or granted if it is currently prevented). For example, where access to the resource was previously granted due to one of the sets of conditions being present, changes to the conditions experienced by the device could lead to that set of conditions no longer being present whilst simultaneously resulting in a different one of the sets of conditions becoming present. Therefore, there is no need for access to the resource to be revoked, despite the change in the set of conditions.

In some embodiments, the method 200 is only concerned with monitoring the conditions when access to the resource has been granted (by operation 206, following a determination at operation 204 that the conditions required by the policy are present). That is to say, the method 200 monitors the conditions in order to prevent access to the resource as soon as the conditions required to access the resource are no longer present. Accordingly, in such embodiments operation 210 is only concerned with detecting changes in those conditions upon which access to the resource have been granted. That is to say, in some embodiments, operation 210 only monitors those conditions that were previously determined to be present to detect when they are no longer present so that access to the resource can be revoked at an appropriate time. Similarly, if it was determined that the conditions indicated by the policy were not present at operation 204, the method 200 may simply end without performing the monitoring at operation 210.

However, in other embodiments, the method 200 is concerned with monitoring the conditions regardless of whether access to the resource has been granted or prevented. That is to say, the method 200 monitors the conditions in order to enable or prevent access to the resource as appropriate in response to changes in the conditions that are required to access the resource. Accordingly, in such embodiments, operation 210 is concerned with detecting changes to the presence in all of the conditions.

In summary, at operation 210, changes to the conditions required to access the resource, as indicated by the policy, are monitored to detect any changes. In response to detecting changes to the conditions, the method repeats operation 204, as discussed above. Otherwise, the method 200 proceeds to an operation 212.

At operation 212, the method 200 determines whether the conditions should continue to be monitored. That is to say, whether the method 200 should repeat operation 210.

In some embodiments, operation 210 may be repeatedly performed as rapidly as possible (i.e. without any delay), so as to provide a continuous (or at least nearly continuous) monitoring of the conditions that the policy requires in order for the resource to be accessed. In other embodiments, a delay may be included between repetitions of operation 210, in order to reduce the computational overhead of performing the method 200, albeit at the expense of delaying the detection of changes to the conditions.

In embodiments where the method 200 is only concerned with monitoring the conditions when access to the resource has been granted, the method 200 may only repeat operation 210 when access to the resource has already previously been granted (i.e. by a previous iteration of operation 206, following a determination at operation 204 that the conditions required by the policy are present). That is to say, the method 200 monitors the conditions so that access to the resource can be prevented as soon as (or at least very shortly after) the conditions required to access the resource are no longer present. In such embodiments, following a determination at operation 204 that the required conditions are not present and the subsequent revocation of access to the resource at operation 208, the method 200 determines at operation 212 that it is no longer necessary to monitor the conditions.

However, in other embodiments, the method 200 is concerned with monitoring the conditions regardless of whether access to the resource has been granted or prevented. That is to say, the method 200 monitors the conditions in order to enable or prevent access to the resource as appropriate in response to changes in the conditions that are required to access the resource. Accordingly, in such embodiments, it is determined to continue monitoring the conditions regardless of the current state of access to the resource.

In some embodiments, the delay that is used between repetitions of operation 210 depends on the current state of access to the resource. For example, if it was determined that the conditions indicated by the policy were present at operation 204 during the previous processing of operation 204, such that access to the resource is currently enabled (following the subsequent processing of operation 206), then a relatively short delay (or even no delay at all) may be used between repetitions of operation 210. This can help ensure the correct enforcement of the policy to prevent access to the resource as soon as possible after a condition changes. However, if it was determined that the conditions indicated by the policy were not present at operation 204 during the previous processing of operation 204, such that access to the resource is currently prevented (following the subsequent processing of operation 208), then a longer delay may be used between repetitions of operation 210. This is because the detection of changes to the conditions may be considered to be less important when access to the resource is already prevented and so it may be desirable to reduce the computational overhead of performing method 200. Of course, in other embodiments, the delay is the same regardless of the current state of access to the resource In some embodiments, the delay between iterations of operation 210 when access to the resource is currently prevented may be dependent upon an amount of time that has elapsed since access to the resource was last enabled (i.e. the amount of time that has elapsed since the conditions indicated by the policy were last present). For example, a shorter (or non-existent) delay may be used when a relatively short amount of time has elapsed since access to the resource was last enabled and a larger delay may be used when a relatively large amount of time has elapsed since access to the resource was last enabled. In particular, when a short period of time has elapsed since access to the resource was last enabled, it may be more likely that the conditions required for access the resource will be re-established. For example, a condition that is dependent upon a geographical location may be temporarily lost (such that the condition is not present) and then re-established as a user moves around. When a longer period of time has elapsed, it may be less likely that the conditions required for access to the resource will be re-established. Of course, in other embodiments, the delay is the same regardless of the amount of time that has elapsed since access to the resource was last enabled.

When the monitoring is no longer required, such as, for example, when the device is locked such that it requires re-authentication to be accessed, the method 200 ends.

Figure 3:
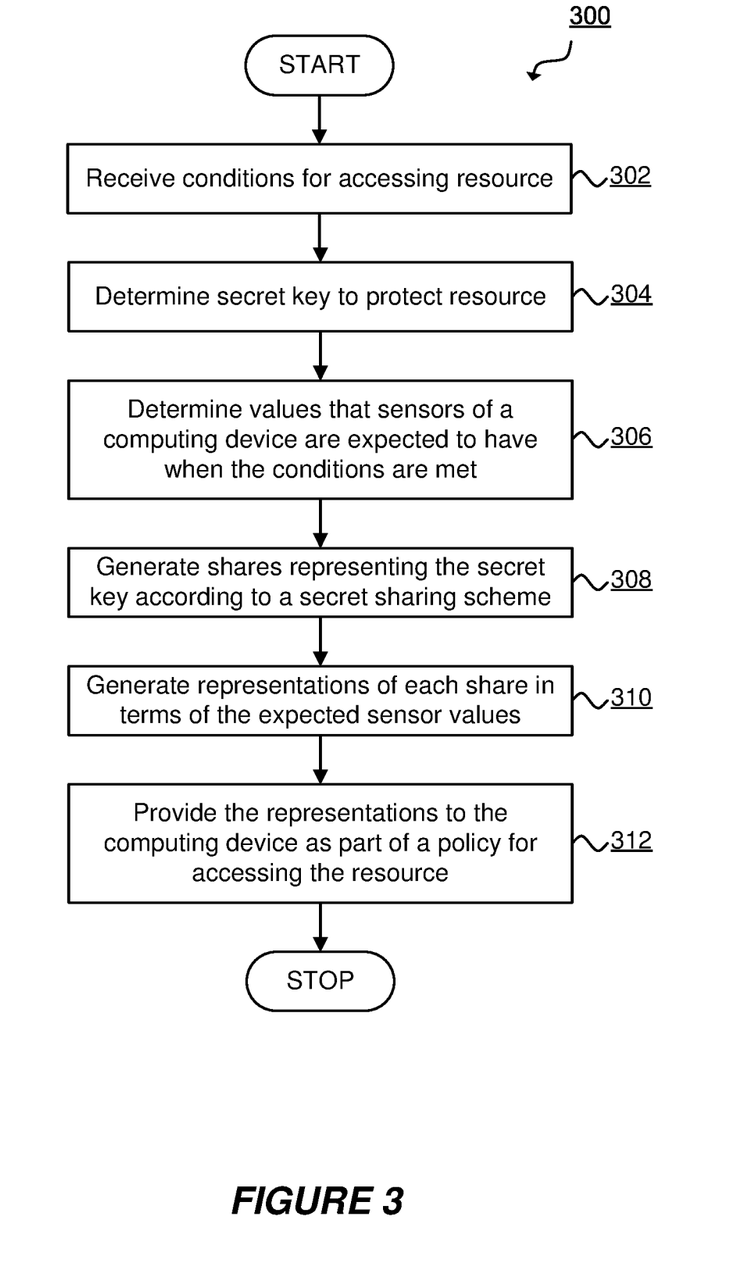
FIG. 3 is a flowchart that schematically illustrates a computer implemented method for controlling access to a resource by a computing device.

FIG. 3 is a flowchart that schematically illustrates a computer implemented method 300 for controlling access to a resource by a computing device. In particular, the method 300 provides a way of creating a policy which includes information that enables a secret key to be recreated from measured values of sensors of a computing device in such a way that, when the set of conditions is present, the key that is generated will be the correct key, which can be used to successfully access the resource. However, when the set of conditions is not present, an incorrect key will be generated, which cannot be used to successfully access the resource. The method 300 starts at an operation 302.

At operation 302, the method 300 receives an indication of a set of conditions under which access to the resource is permitted. As discussed above in relation to the method 200, in some embodiments the resource comprises an item of data, whilst in other embodiments, the resource comprises a service. Similarly, the set of conditions are the same as those discussed above in relation to FIG. 2 and may, for example, include conditions relating to a computing device's environment and/or current user. Furthermore, as discussed above in relation to FIG. 2, in some embodiments, multiple sets of conditions may be specified for accessing the same resource. Having received the indication of a set of conditions under which access to the resource is permitted, the method 300 proceeds to an operation 304.

At operation 304, the method 300 determines a secret key to be used to protect access to the resource. That is to say, the secret key is a key that is required in order to access the resource.

For example, where the resource is an item of data, the item of data may be protected by encrypting the item of data with the secret key to create an encrypted copy of the item of data which may be provided to a computing device. In order to access the item of data, the computing device can decrypt the encrypted copy of the item of data if it has access to the secret key.

As another example, where the resource is a service, access to the service can be protected using an access control mechanism which is based on the secret key being used as a credential. In some cases, for example, the access control mechanism may require the secret key to be provided in order to access the service and will only allow the service to be used if a correct copy of the secret key. In other cases, the access control mechanism may issue a challenge in response to a request to access the service and will only permit access if a correct response to the challenge is provided. In such examples, the response that is required to the challenge is dependent on the secret key, meaning that a computing device will only be able to compute the correct response (and thereby gain access to the resource) if it has access to a correct copy of the secret key.

In some embodiments, the secret key may be a pre-existing key that is associated with a resource (such as an existing encryption key or credential), in which case that key may be retrieved at operation 304.

In other embodiments, the secret key may be generated for use with the method. In such cases, the generated secret key is then associated with the resource such that the resource is protected by the key. For example, where the resource is an item of data, the generated secret key may be used to encrypt the item of data, which can then be provided to the computing device (and only accessed by the computing device using the secret key). Alternatively, where the resource is a service, the secret key may be registered with an access control mechanism for the service as a valid secret key that can be used to access the service.

In any case, having determined the secret key that is to be used to protect the resource, the method 300 proceeds to an operation 306.

At operation 306, the method 300 determines a set of values that correspond to the respective values that would be measured by the one or more sensors of the computing device when the set of conditions is present. That is to say, when the set of conditions is present at a computing device, the set of values is the set of values that would be expected to be measured. The set of values may therefore be referred to as the set of expected values. As examples (each example continuing the correspondingly lettered example discussed in relation to the method 200 illustrated by FIG. 2):

a.) where the conditions include a condition that a certain level of light is required for the resource to be accessed, the set of values may include an expected value from a light sensor 110f;

b.) where the conditions include a condition that the computing device should be in a particular geographical location in order to access the resource, the set of values may include an expected value for the coordinates provided by a GPS sensor.

c.) where the conditions include a condition that the computing device should be in an environment with a certain level of background noise, the set of values may include an expected value from a microphone 110c;

d.) where the conditions include a condition that the computing device should be connected to a particular network, the set of values may include an expected value from a network interface 106 that indicates whether the device is connected to that network;

e.) where the conditions include a condition that the computing device should be being operated under a certain speed in order for a resource to be accessed, the set of values may include a range of acceptable speeds that can be derived from measurements of the GPS sensor 110e;

f.) where the conditions include a condition that the device should be at a particular altitude in order to access the resource, the set of values may include a value from a barometric pressure sensor;

Similarly, where the conditions include conditions relating to the user, such as those that are based on the user's behavioral biometrics, the set of values may include values that are expected to be measured by various sensors when that user is using the computing device.

As will be appreciated, it is necessary for the expected values to be determined in a manner which yields repeatable results whilst distinguishing between the different situations in which access to a resource may be allowed and those in which access to the resource is not allowed. The skilled person would be readily familiar with techniques for doing this. For example, the granularity (or accuracy) with which each value is measured may be lowered to ensure that repeated measurements are likely to provide the same result at the level of granularity that is chosen. Similarly, measurements may be classified into broader categories that the measurements belong to and each such category may be associated with a particular value. For example, the measurements may be classified into ranges of measurements and a value associated with each of the ranges. This technique can be used for example, where the expected value is a range of expected values. Additionally (or alternatively), normalisation techniques may be used to normalize the data that is provided by the sensors. For example, multiple measurements of a particular feature may be averaged to provide an average measurement for that feature (such as an average speed of touch, or an average length of stroke and so on). Similarly, data from other sensors may be used to normalize the data that is read from another sensor (e.g. data from a gravity sensor $110j$ may be used to normalize data from an accelerometer $110h$ so that it is relative to a "real world" coordinate system rather than being relative to the computing device 100). The skilled person would be readily familiar with these, as well as other techniques that may be used to ensure that the measurements of the values are captured in a manner which is repeatable.

Having determined a set of values that would be derivable by the computing device from measurements taken by one or more sensors when the set of conditions is present at the computing device (but not when the set of conditions is absent), the method 300 proceeds to an operation 308.

At operation 308, the method 300 generates a plurality of shares that represent the secret key in accordance with a secret sharing scheme.

As will be known by those skilled in the art, secret sharing schemes (which may also be referred to as secret splitting schemes) refer to methods for distributing a secret S amongst a number n of secret shares $S_1, \ldots, S_n$ (also referred to herein as shares) in such a way that the secret S can be computed (or recreated) from the combination of any t or more secret shares $S_n$, but cannot be recreated from any combination of t−1 or fewer shares $S_n$. Since the secret S can be recreated from the shares $S_n$, it can be considered that the set of secret shares $S_1, \ldots, S_n$ collectively form a secure representation of the secret. The number t of shares $S_n$ that are required to recreate the secret S may be referred to as the threshold of the secret sharing scheme. There are many known secret sharing schemes and any suitable secret sharing scheme may be used in embodiments of the disclosure.

One example of a secret sharing scheme that may be used with embodiments of the disclosure is Shamir's secret sharing scheme, the details of which were initially set out in the paper "*How to Share a Secret*" by Adi Shamir published in Communications of ACM, Volume 22, Number 11, November 1979. As will be known, this system makes use of the idea that a polynomial of order t−1 is only completely defined by a set of at least t points that lie on that polynomial or, in other words, fewer than t points are insufficient to define a unique polynomial of degree t−1. Accordingly, the method used by Shamir's secret sharing scheme involves defining a polynomial of degree t−1, i.e.

$$f(x)=a_0+a_1 \cdot x+a_2 \cdot x^2+ \ldots +a_{t-1} \cdot x^{k-1},$$

with the first coefficient $a^0$ being set as the secret S, and the remaining coefficients $a_1, a_2, \ldots a_{t-1}$ being picked at random. Having defined a specific polynomial in which the secret S is embedded as the first coefficient $a_0$, any n points $p_1, \ldots p_n$ on the polynomial are then found (e.g. by evaluating $f(1), \ldots f(n)$ respectively). These n points form the n secret shares $S_n=\{S_1, \ldots, S_n\}$ (i.e. $S_1=p_1, \ldots S_n=p_n$). These secret shares $S_1, \ldots, S_n$ represent the secret S because when at least t of the secret shares $S_i$ are known then t points lying on a polynomial in which the secret S is embedded are known. From these t points, it is possible to recreate the unique polynomial of degree t−1 and thereby recover the secret S which is embedded as the first coefficient $a_0$ of the polynomial.

In other embodiments, another suitable secret sharing scheme, such as Blakley's secret sharing scheme (details of which were initially set out in the paper "*Safeguarding cryptographic keys*", by G. R. Blakley published as part of Managing Requirements Knowledge, International Workshop on (AFIPS) 48 313-317, 1979) may be used instead.

Conventionally, secret sharing schemes, such as Shamir's secret sharing scheme, have been used to distribute a secret S amongst a group of participants, each of whom is allocated a share $S_n$ of the secret. The secret can only be reconstructed when a sufficient number, t (the threshold number), of shares are combined. By using such secret sharing schemes in this manner, conventional applications of secret sharing schemes help to enforce security requirements that a certain number, t, of the group of participants must be present and cooperate before the secret S will be revealed (or at least require that a certain number t of the participants have their shares $S_n$ compromised for an attacker to be able to access the secret S). However, as will become apparent from the following discussion, the use of secret sharing schemes by embodiments of the present disclosure relating to the method 300 illustrated by FIG. 3 is different from this conventional use. In particular, in such embodiments, the set of shares $S_n$ (or at least information about how to generate the set of shares) is intended to be provided together to the same user or computing device, rather than being split between different users or computing devices.

At operation 310, the method 300 generates a representation of each of the shares in terms of at least one of the set of values. That is to say, each of the shares $S_n$ is expressed in terms of the set of expected values. For example, an equation can be specified in which each of the expected values $V_m=\{v_1, \ldots, v_m\}$ is multiplied by a respective coefficient $C_m=\{c_1, \ldots c_m\}$ and the value of which is then modified by a residual value r as follows:

$$S_n=c_1 \cdot v_1+ \ldots +c_m \cdot v_m+r$$

Each share $S_n$ can therefore be expressed (or specified) in terms of a respective set of coefficients $C_m$ associated with each of the measured values and a respective residual value r. By expressing the shares $S_n$ in this manner, each of the shares can be reconstructed by inputting measurements of the values $V_m$ into this equation. If the measured values correspond to those that were expected, which means that the set of conditions are present at the computing device, the correct value for each of the shares $S_n$ will be reconstructed. Otherwise, if one of the values is not as expected, meaning that at least one of the set of conditions is not present, an incorrect value for one or more of the shares $S_n$ will be reconstructed.

The threshold t that is used with the secret sharing scheme dictates the number of incorrect shares that can be tolerated whilst still enabling the secret key to be correctly reconstructed. In some embodiments, the threshold t may be the same as the total number n of shares $S_n$ that are generated (i.e. t=n), such that all of the shares will need to be correctly reconstructed in order for the secret key S to be reconstructed correctly. However, in other embodiments, the threshold t may be less than the total number n of shares $S_n$ that are generated (i.e. t<n), such that incorrect reconstruction of a certain number (n−t) of the shares can be tolerated and still enable the correct secret key S to be reconstructed. As will be appreciated, by selecting an appropriate threshold t and defining the shares $S_n$ in terms of different ones of the expected values $V_m$ in an appropriate way, more complex policies can be represented which enable a resource to be accessed when only at least a certain number (i.e. t) of a set of conditions are present. For example, in order to restrict access to a resource when a person is at home, a set of 2 shares could be generated, the first share being specified in terms of the output of a GPS sensor which relates to the user's home location and the second share being specified in terms of the output from a network interface when the device is connected to the user's home network. If the threshold t of the secret sharing scheme is set at 2 (i.e. t=n), both of these conditions (geographical location and connection to a particular network) will need to be present for the secret key to be reconstructed. However, if the threshold t is set at 1 (i.e. t<n), then the secret key can be reconstructed if either of these conditions are present. Of course, it will be appreciated that where a lower threshold is used (i.e. t<n), there are different combinations of shares $S_n$ that can be used to generate different copies of the secret key and it may be necessary to test different copies of the secret key to determine which one is correct (since those keys that are generated based on incorrectly reconstructed shares will not be correct).

At operation 312, the method 300 provides a policy comprising the representations of each of the shares to the computing device. That is to say, the policy that is provided comprises indications to the computing device of how to generate the shares $S_n$ from measurements from one or more sensors. These indications may also specify any processing that needs to be performed on the output of the sensors (such as conversion to a particular resolution, averaging/normalisation and/or categorisation) prior to its use to generate the shares $S_n$. Accordingly, the computing device can use these indications (for example, during operation 204) to generate the shares $S_n$, reconstruct the secret key and access the resource (when the secret key is reconstructed correctly). Having provided the policy to the computing device, the method 300 ends.

Insofar as embodiments of the present disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example. Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure. It will be understood by those skilled in the art that, although the present disclosure has been described in relation to the above described example embodiments, the disclosure is not limited thereto and that there are many possible variations and modifications which fall within the scope of the disclosure. The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

Various aspects and embodiments of the present disclosure are additionally considered.

According to a first aspect of the present disclosure, there is provided a computer implemented method for accessing a resource, the method comprising, at a computing device: receiving a policy indicating a set of conditions under which access to the resource is permitted; determining whether each of the conditions are initially present based on an output of one or more sensors of the device; and monitoring the one or more sensors to detect a change in the presence of one or more of the conditions; determining whether each of the conditions are present in response to detecting the change in the presence of one or more of the conditions; enabling access to the resource in response to determining that each of the conditions is present; and preventing access to the resource in response to determining that at least one of the conditions is not present.

In embodiments, the policy indicates a plurality of sets of conditions under which access to the resource is permitted; access to the resource is enabled in response to determining that each of the conditions in at least one of the sets of conditions are present; and access to the resource is prevented in response to at least one condition being absent from each of the sets of conditions.

In embodiments, access to the resource is protected by a secret key; enabling access to the resource comprises obtaining a copy of the secret key and using the copy of the secret key to access the resource; and preventing access to the resource comprises erasing any copies of the secret key.

In embodiments, the resource comprises an item of data, wherein an encrypted version of the item of data is accessible by the computing device; enabling access to the resource further comprises recreating a copy of the item of data by using the copy of the secret key to decrypt the encrypted version of the item of data; and preventing access to the resource further comprises erasing the recreated copy of the item of data.

In embodiments, the policy indicates how a set of shares representing the secret key in accordance with a secret sharing scheme can be generated based on the output of the one or more sensors; and obtaining a copy of the secret key comprises: generating a set of shares from the output of the one or more sensors as indicated by the policy; and recreating a copy of the secret key based on the generated set of shares in accordance with the secret sharing scheme.

In embodiments, the method is performed by an isolated process executing according to a trusted computing environment of the computing device.

In embodiments, the set of conditions comprise one or more conditions that are related to the computing device's environment.

In embodiments, the one or more conditions related to the computing device's environment are based on one or more of: a light level; a geographical-location; a noise level; connectivity to a particular network; a speed; and an altitude.

In embodiments, the set of conditions comprise one or more conditions that are related to a user of the computing device.

In embodiments, the one or more conditions related to the user are based on one or more behavioral biometrics of the user.

According to a second aspect of the present disclosure, there is provided a computer-implemented method for controlling access to a resource by a computing device, the method comprising: receiving an indication of a set of conditions under which access to the resource is permitted; determining a secret key to be used to protect access to the resource; determining a set of values that correspond to the respective values that would be measured by the one or more sensors of the computing device when the set of conditions is present; generating a plurality of shares representing the secret key in accordance with a secret sharing scheme; generating, for each of the shares, a representation of that share in terms of at least one of the set of values; and providing a policy comprising the representations of each of the shares to the computing device.

In embodiments, the resource comprises an item of data and the method further comprises: encrypting the item of data using the secret key to create an encrypted version of the item of data; and providing the encrypted version of the item of data to the computing device.

According to a third aspect of the present disclosure, there is provided a computer system comprising a processor and a memory storing computer program code for performing a method as described herein.

According to a fourth aspect of the present disclosure, there is provided a computer program which, when executed by one or more processors, is arranged to carry out a method as described herein.

The invention claimed is:

1. A computer implemented method for accessing a resource, wherein access to the resource is protected by a secret key, the method comprising, at a computing device:
   receiving a policy indicating a set of conditions under which access to the resource is permitted, wherein the policy indicates how a set of shares representing the secret key in accordance with a secret sharing scheme can be generated based on an output of one or more sensors of the computing device;
   determining whether each condition of the set of conditions are initially present based on the output of the one or more sensors;
   monitoring the one or more sensors to detect a change in the presence of one or more conditions of the set of conditions;
   determining whether each condition of the set of conditions are present in response to detecting the change in the presence of the one or more conditions; and
   enabling access to the resource in response to determining that each condition of the set of conditions is present, comprising:
      obtaining a copy of the secret key by generating the set of shares from the output of the one or more sensors as indicated by the policy and creating the copy of the secret key based on the generated set of shares in accordance with the secret sharing scheme;
      using the copy of the secret key to access the resource; and
   preventing access to the resource in response to determining that at least one condition of the set of conditions is not present by erasing any copies of the secret key.

2. The method of claim 1, wherein:
the policy indicates a plurality of sets of conditions under which access to the resource is permitted;
access to the resource is enabled in response to determining that each of the conditions in at least one of the plurality of sets of conditions are present; and
access to the resource is prevented in response to at least one condition being absent from each of the plurality of sets of conditions.

3. The method of claim 1, wherein:
the resource comprises an item of data, wherein an encrypted version of the item of data is accessible by the computing device;
enabling access to the resource further comprises creating a copy of the item of data by using the copy of the secret key to decrypt the encrypted version of the item of data; and
preventing access to the resource further comprises erasing the copy of the item of data.

4. The method of claim 1, wherein the method is performed by an isolated process executing according to a trusted computing environment of the computing device.

5. The method of claim 1, wherein the set of conditions comprise one or more conditions that are related to the computing device's environment.

6. The method of claim 5, wherein the one or more conditions that are related to the computing device's environment are based on one or more of:
a light level;
a geographical-location;
a noise level;
connectivity to a particular network;
a speed; and
an altitude.

7. The method of claim 1, wherein the set of conditions comprise one or more conditions that are related to a user of the computing device.

8. The method of claim 7, wherein the one or more conditions that are related to the user are based on one or more behavioral biometrics of the user.

9. A computer system comprising a processor and a memory storing computer program code for performing the method of claim 1.

10. A computer program which, when executed by one or more processors, is arranged to carry out the method of claim 1.

* * * * *